United States Patent
Gim et al.

(10) Patent No.: US 12,240,766 B2
(45) Date of Patent: Mar. 4, 2025

(54) DEFECT-FREE LITHIUM NICKEL(3+) OXIDE MATERIALS FOR USE IN LITHIUM BATTERIES AND METHOD OF PREPARATION THEREOF

(71) Applicant: UCHICAGO ARGONNE, LLC, Chicago, IL (US)

(72) Inventors: Jihyeon Gim, Naperville, IL (US); Eungje Lee, Naperville, IL (US); Jinhyup Han, Naperville, IL (US); Jason R. Croy, Plainfield, IL (US)

(73) Assignee: UChicago Argonne, LLC, Chicago, IL (US)

( * ) Notice: Subject to any disclaimer, the term of this patent is extended or adjusted under 35 U.S.C. 154(b) by 477 days.

(21) Appl. No.: 17/748,890

(22) Filed: May 19, 2022

(65) Prior Publication Data

US 2023/0373812 A1    Nov. 23, 2023

(51) Int. Cl.
*C01G 53/00* (2006.01)
*C01G 53/50* (2025.01)
*H01M 10/0525* (2010.01)

(52) U.S. Cl.
CPC ........ *C01G 53/50* (2013.01); *H01M 10/0525* (2013.01); *C01P 2004/61* (2013.01); *C01P 2006/40* (2013.01)

(58) Field of Classification Search
CPC ...... C01G 53/50; C01G 53/006; C01G 53/42; H01M 10/0525; H01M 4/525; C01P 2004/61; C01P 2006/40; Y02E 60/10
See application file for complete search history.

(56) References Cited

U.S. PATENT DOCUMENTS

| | | | | |
|---|---|---|---|---|
| 10,714,745 | B2* | 7/2020 | Lu | H01M 4/661 |
| 2009/0004097 | A1* | 1/2009 | Jung | C01G 53/006 |
| | | | | 429/231.95 |
| 2012/0070746 | A1* | 3/2012 | Mikhaylik | H01M 10/4235 |
| | | | | 429/231.95 |

(Continued)

OTHER PUBLICATIONS

Arora, P. et al., Battery Separators, Chemical Review 104, 4419-4462 (2004).

(Continued)

*Primary Examiner* — Abdullah A Riyami
*Assistant Examiner* — Nader J Alhawamdeh
(74) *Attorney, Agent, or Firm* — Olson & Cepuritis, Ltd.

(57) ABSTRACT

Substantially defect-free layered lithium nickel oxide materials of Formula (I): $Li_{(1-x)}(Ni_{(1-y)}M_y)_{(1+x)}O_2$ and Formula (II): $Li_aNi_bM_cO_2$ are provided herein, wherein M is one or more metal selected from the group consisting of Co, Mn, Al, Mg, Ti, B, Zr, Nb, and Mo; $0 \le x \le 0.05$; and $0 \le y \le 0.1$, $0.97 \le a \le 1.03$; $0.9 \le b \le 1$; $0 \le c \le 0.1$; and $0.97 \le (b+c) \le 1.03$; and the material has a layered structure with no more than about 1.2 percent disorder between lithium and transition metal (TM) layers, as determined by structural refinement calculations on x-ray diffraction (XRD) data, compared to an ideal layered $LiNiO_2$ structure. The materials can be formed by heating $Ni(OH)_2$ or NiO with lithium hydroxide at a temperature in the range of about 650 to 680° C.

28 Claims, 6 Drawing Sheets

(56) References Cited

U.S. PATENT DOCUMENTS

2022/0029156 A1* 1/2022 Thackeray ............ H01M 4/623
2023/0373812 A1* 11/2023 Gim ................. H01M 10/0525

OTHER PUBLICATIONS

Bae, C. et al., Further Improving Coulombic Efficiency and Discharge Capacity in LiNiO2 Material by Activating Sluggish ~3.5 V Discharge Reaction, ACS Applied Materials & Interfaces 13, 23760-23770 (2021).

Hwang, S. et al., Investigating Local Degradation and Thermal Stability of Charged Nickel-Based Cathode Materials Through Real-Time Electron Microscopy, ACS Applied Materials & Interfaces 6, 15140-15147 (2014).

Jow et al. (Eds), Electrolytes for Lithium and Lithium-Ion Batteries; Chapter 1, pp. 1-92; Springer, New York, NY (2014).

Jow et al. (Eds), Electrolytes for Lithium and Lithium-Ion Batteries; Chapter 2, pp. 93-166; Springer, New York, NY (2014).

Jow et al. (Eds), Electrolytes for Lithium and Lithium-Ion Batteries; Chapter 3, pp. 167-182; Springer, New York, NY (2014).

Jow et al. (Eds), Electrolytes for Lithium and Lithium-Ion Batteries; Chapter 4, pp. 209-266; Springer, New York, NY (2014).

Li, H. et al., Updating the Structure and Electrochemistry of LixNIO2 for 0≤x≤1, Journal of the Electrochemical Society 165 (13) A2985-A2993 (2018).

Lin, F. et al., Surface Reconstruction and Chemical Evolution of Stoichiometric Layered Cathode Materials for Lithium-Ion Batteries, Nature Communications 5:3529, 1-9 (2014).

Long, B.R. et al., Enabling High-Energy, High-Voltage Lithium-Ion Cells: Standardization of Coin-Cell Assembly, Electrochemical Testing, and Evaluation of Full Cells, Journal of The Electrochemical Society 163 (14), A2999-A3009 (2016).

Ma, D. et al., Si-Based Anode Materials For Li-Ion Batteries: A Mini Review, Nano-Micro Letters 6 (4), 347-358 (2014).

Mekonnen, Y. et al., A Review of Cathode and Anode Materials For Lithium-Ion Batteries, Southeast Conference 2016, Norfolk, VA, pp. 1-6, IEEE (2016).

Mesnier, A. et al., Synthesis of LiNiO2 at Moderate Oxygen Pressure and Long-Term Cyclability in Lithium-Ion Full Cells, ACS Applied Materials & Interfaces 12, 52826-52835 (2020).

Nestler, T. et al., AIP Conference Proceedings 1597, 155 (2014): https://doi.org/10.1063/1.4878486.

Rye, H. et al., Capacity Fading Mechanisms in Ni-Rich Single-Crystal NCM Cathodes, ACS Energy Letters 6, 2726-2734 (2021).

Yamada, S. et al., Synthesis and Properties of LiNiO2 as Cathode Material For Secondary Batteries, Journal of Power Sources 54, 209-213 (1995).

Yoon, C. S. et al., Structural Stability of LiNiO2 Cycled Above 4.2, ACS Energy Letters 2, 1150-1155 (2017).

Zhu, B. et al., Towards High Energy Density Lithium Battery Anodes: Silicon and Lithium, Chemical Science 10, 7132-7148 (2019).

Zou, L. et al., The Role of Secondary Particle Structures in Surface Phase Transitions of Ni-Rich Cathodes, Chemistry of Materials 32, 2884-2892 (2020).

* cited by examiner

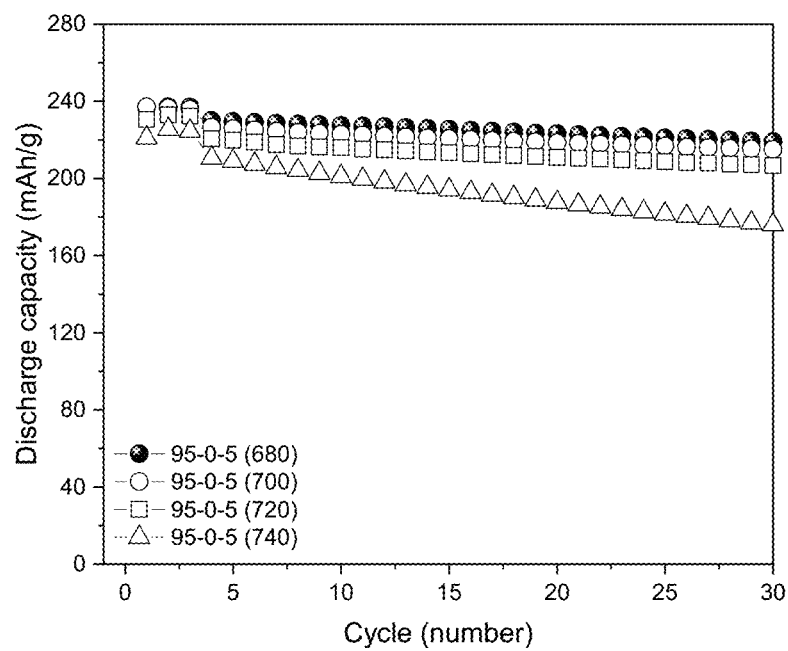
FIG. 16
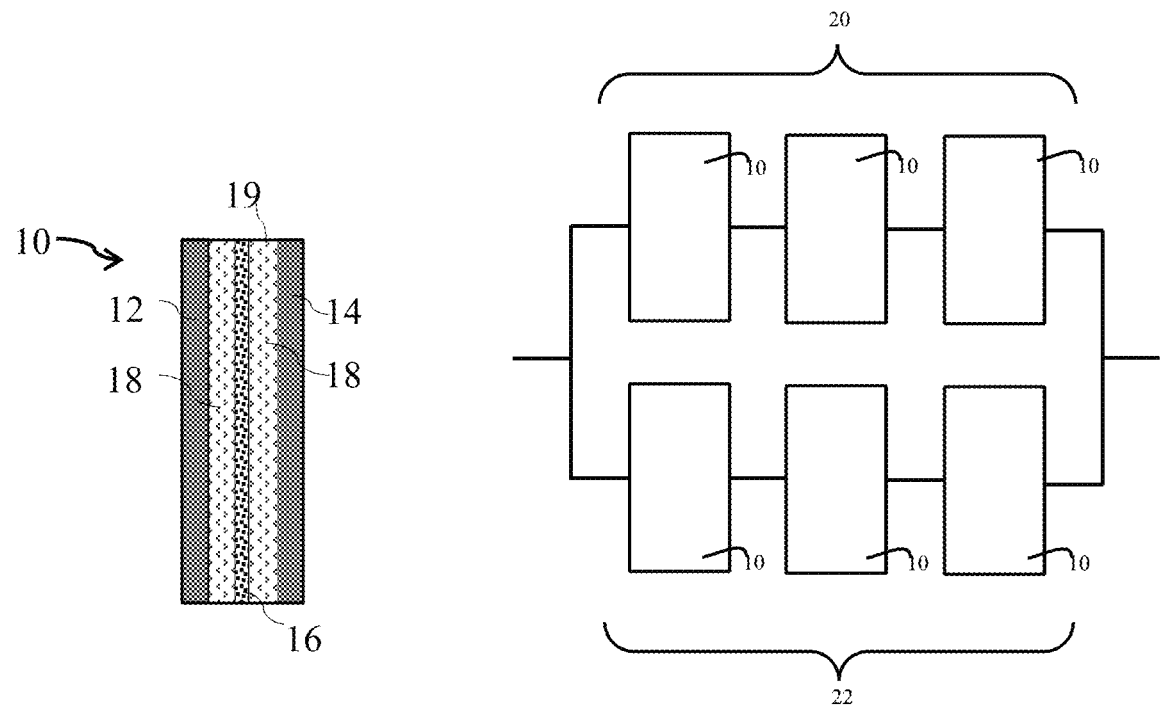
FIG. 17
FIG. 18

DEFECT-FREE LITHIUM NICKEL(3+) OXIDE MATERIALS FOR USE IN LITHIUM BATTERIES AND METHOD OF PREPARATION THEREOF

CONTRACTUAL ORIGIN OF THE INVENTION

The United States Government has rights in this invention pursuant to Contract No. DE-AC02-06CH11357 between the United States Government and UChicago Argonne, LLC representing Argonne National Laboratory.

FIELD OF THE INVENTION

This invention relates to electrode materials useful for rechargeable lithium-based battery systems. More particularly, this invention relates to layered lithium nickel(3+) oxide materials.

BACKGROUND $LiNiO_2$ (LNO) has been of interest as an alternative to its layered counterpart, $LiCoO_2$, for many years, because of its intrinsically high energy content without the need of expensive cobalt. However, LNO has never achieved commercial success due, in part, to a lack of structural stability when cycling at high states of charge (> about 60%). These structural instabilities have been presumed to be inherent to LNO. For example, oxygen loss at voltages as low as 4.2V (vs. Li/Li+) has been cited as a degradation mechanism. In addition, particle cracking over extended cycling is often cited as a main cause of capacity fade and impedance rise. Furthermore, extensive surface reconstruction is often reported for cycled LNO and LNO-based electrodes. However, to date, true layered $LiNi^{3+}O_2$ structures have not actually been realized in practice, and all studies are typically undertaken using $Li_{1-x}Ni_{1+x}O_2$ oxides (and/or its substituted derivatives) with mixed Ni(2+/3+) oxidation states as well as $Li^+/Ni^{2+}$ disorder between the lithium and transition metal (TM) layers. Site exchange between $Li^+/Ni^{2+}$, leading to $Li_{1-x}Ni_{1+x}O_2$ oxides, results from $Ni^{3+}$ instabilities at high temperatures coupled with an extreme sensitivity of the LNO structure to temperature and atmosphere during synthesis.

Studies to date emphasize the importance of high oxygen partial pressures (i.e. 100% pure oxygen) as a necessary condition for producing LNO oxides. However, these oxides still fall within the class of disordered $Li_{1-x}Ni_{1+x}O_2$ oxides and do not deliver adequate cycling stability.

In view of the issues described above, there are ongoing needs for new low-defect LNO materials for use in lithium battery systems, and methods of preparing such materials. The methods, materials, electrodes, cells and batteries described herein address these needs.

SUMMARY

Described herein are layered $LiNiO_2$ materials having substantially defect-free structures with low Li/TM layer exchange and a method of preparing the materials that allows for greater control over properties such as site exchange, surface structures, stacking faults, residual lithium (e.g., $Li_2CO_3$) and particle morphologies conducive to cycling stability. The materials exhibit unexpectedly well-defined layered $LiNiO_2$ structures with stable cycling of substantial capacities over many charge/discharge cycles.

Structural defects such as Li/Ni disorder and stacking faults within the bulk of the LNO particles, created during less-than-ideal synthesis conditions, can adversely influence electrochemical properties and stability. Such local structural defects are typically quantified through an analysis of X-ray diffraction (XRD) and transmission electron microscopy (TEM) data. However, XRD data relies on some amount of coherence within a crystalline lattice and disordered structures on a more local level will go undetected. TEM is also a local probe and does not provide statistically representative information. As such, determination of local defects based on conventional analytical techniques alone may underestimate actual defect content.

As described herein, the substantially defect-free LNO materials exhibit a combination of physiochemical properties that accompany the uniquely stable performance of the $LiNiO_2$ electrodes synthesized by the methods disclosed herein. These materials give X-ray data that can be refined to less than about 1.2% $Li^+/Ni^{2+}$ exchange. The materials exhibit first cycle efficiencies of > about 95% under high upper cut-off voltages (UCV) (> about 4.2V), as well as high lithium diffusion at low states of charge (SOCs). In addition, the materials described herein, when processed as described, can undergo a relaxing of chemomechanical stress during cycling by way of intra-grain cracks that are isolated within primary particles. The intra-grain cracks serve to suppress the formation of inter-grain cracks that can propagate along grain boundaries, thereby exposing newly formed surfaces to electrolytes and leading to disordered rock salt interface layers; a main mechanism of capacity fade and impedance rise in Ni-rich cathode-oxides. Likewise, high resolution microscopy reveals very few stacking faults for these oxides within a narrow range of the synthesis parameters discussed.

Furthermore, these materials do not show evidence of oxygen loss when used as electrode materials at about 4.2V, which is the currently accepted norm, and can reversibly cycle at > about 200 mAh/g for many charge/discharge cycles with minimal capacity loss and impedance rise. Unexpectedly, these high-performance LNO oxides do not require high oxygen partial pressures during synthesis, as is the currently accepted state-of-the-art condition for making high Ni-content lithium metal oxide materials. Such a combination of excellent properties is not achieved by current state-of-the-art LNO or substituted derivatives (e.g., ≥90% Ni). The methods described herein take advantage of recently gained knowledge that allows for preparation of LNO materials at relatively low temperatures of less than about 700° C., to synthesize defect-free LNO without the need of high oxygen partial pressures. Lowering the temperature and mitigating the need for high-oxygen atmosphere lowers costs and increases safety of processing conditions, especially at large scale. In addition, substantially defect-free derivatives of LNO with Ni contents of ≥90% can be prepared, as well.

In one aspect, substantially defect-free layered lithium nickel oxide materials of Formula (I): $Li_{(1-x)}(Ni_{(1-y)}M_y)_{(1+x)}O_2$ are provided, in which M is one or more metal selected from the group consisting of Co, Mn, Al, Mg, Ti, B, Zr, Nb, and Mo; 0≤x≤0.05; and 0≤y≤0.1; and the material has a layered structure. In a preferred embodiment, both x and y are 0, such that the material is substantially defect-free $LiNiO_2$.

In another aspect, substantially defect-free layered lithium nickel oxide materials of Formula (II): $Li_aNi_bM_cO_2$ are provided, in which M is one or more metal selected from the group consisting of Co, Mn, Al, Mg, Ti, B, Zr, Nb, and Mo;

$0.97 \leq a \leq 1.03$; $0.9 \leq b \leq 1$; $0 \leq c \leq 0.1$; and $0.97 \leq (b+c) \leq 1.03$ and the material has a layered structure.

In a preferred embodiment, $0.95 \leq b \leq 1$, and $0 \leq c \leq 0.05$.

The substantially defect-free layered lithium nickel(III) oxide materials of Formula (I) and (II), such as $LiNiO_2$ and $LiNi_{0.95}Co_{0.05}O_2$, exhibit exemplary performance in lithium cells and batteries, with improved first-cycle coulombic efficiency and capacity retention compared to conventional layered lithium nickel(III) oxide materials having greater levels of Li/TM disorder.

In one method aspect, substantially defect-free layered lithium nickel(3+) oxide materials (e.g., materials of Formula (I) or (II)) are prepared by heating a stoichiometric mixture of lithium hydroxide and a metal hydroxide at a temperature in the range of about 650 to about 680° C., in an oxygen-containing atmosphere, to produce the substantially defect-free layered lithium nickel(3+) oxide material, wherein the metal hydroxide comprises at least about 90 mol % single-phase spherical β-Ni(2+) hydroxide (β-Ni(OH)$_2$) particles having a secondary particle size of less than about 15 μm, optionally in combination with up to about 10 mol % of M hydroxides. Preferably, the lithium hydroxide is LiOH·H$_2$O. In some preferred embodiments, the oxygen-containing atmosphere is air. In some embodiments, the metal hydroxide is about 100 mol % β-Ni(OH)$_2$.

In another method aspect, substantially defect-free layered lithium nickel(3+) oxide materials (e.g., materials of Formula (I) or (II)) are prepared by the sequential steps of (a) heating a metal hydroxide at a temperature in the range of about 200 to about 500° C., e.g., about 325 to about 375° C. to convert the metal hydroxide to a metal oxide, wherein the metal hydroxide comprises at least about 90 mol % single-phase spherical β-Ni(OH)$_2$ particles having a secondary particle size of less than about 15 μm, optionally in combination with up to about 10 mol % of M or M' hydroxides; (b) adding a stoichiometric amount of lithium hydroxide to the metal oxide formed in step (a) to form a precursor mixture; and then (c) heating the precursor mixture at a temperature in the range of 650 to about 680, in an oxygen-containing atmosphere, to produce substantially defect-free layered lithium nickel(3+) oxide material. Preferably, the lithium hydroxide is LiOH·H$_2$O. In some preferred embodiments, the oxygen-containing atmosphere is air. In some embodiments, the metal hydroxide is about 100 mol % β-Ni(OH)$_2$.

The methods described herein surprisingly produce layered lithium nickel oxide materials with very low levels of Li/Ni disorder (as determined by refinement of XRD data), which exhibit significant improvements in first cycle coulombic efficiency and cycling stability relative to lithium nickel(III) oxide materials produced by conventional methods.

The following non-limiting embodiments of the materials and methods described herein are provided below to illustrate certain aspects and features of the compositions and methods described herein.

Embodiment 1 is a method of preparing a substantially defect-free layered lithium nickel(3+) oxide material having no more than about 1.2 percent disorder between lithium and transition metal (TM) layers, as determined by structural refinement calculations on x-ray diffraction (XRD) data, compared to an ideal layered $LiNiO_2$ structure; the method comprising:

heating a stoichiometric mixture of lithium hydroxide and a nickel-containing precursor composition at a temperature in the range of about 650 to about 680° C., in an oxygen-containing atmosphere, for a time sufficient to form the substantially defect-free layered lithium nickel(3+) oxide material;

wherein the nickel-containing precursor composition comprises:

(a) a metal hydroxide composition that comprises at least about 90 mol % single-phase spherical β-Ni(2+) hydroxide (β-Ni(OH)$_2$) particles having a secondary particle size of less than about 15 μm, optionally in combination with up to about 10 mol % of M hydroxide; or (b) a metal oxide composition comprising at least about 90 mol % NiO particles having a secondary particle size of less than about 15 μm, optionally in combination with up to about 10 mol % of an M hydroxide and/or an M oxide;

wherein M is at least one metal selected from the group consisting of Co, Mn, Al, Mg, Ti, B, Zr, Nb, and Mo.

Embodiment 2 is the method of embodiment 1, wherein the substantially defect-free layered lithium nickel(3+) oxide material is a material of Formula (I): $Li_{(1-x)}(Ni_{(1-y)}M_y)_{(1+x)}O_2$; wherein M is one or more metal selected from the group consisting of Co, Mn, and Al; $0 \leq x \leq 0.05$; and $0 \leq y \leq 0.1$.

Embodiment 3 is the method of embodiment 1, wherein the substantially defect-free layered lithium nickel(3+) oxide material is a material of Formula (II): $Li_a Ni_b M_c O_2$; wherein M is one or more metal selected from the group consisting of Co, Mn, and Al; $0.97 \leq a \leq 1.03$; $0.9 \leq b \leq 1$; $0 \leq c \leq 0.1$; and $0.97 \leq (b+c) \leq 1.03$.

Embodiment 4 is the method of embodiment 1, wherein M is selected from the group consisting of Co, Mn, and Al.

Embodiment 5 is the method of any one of embodiments 1 to 4, wherein the oxygen-containing atmosphere is air.

Embodiment 6 is the method of any one of embodiments 1 to 5, further comprising the step of preparing the NiO by heating single-phase spherical β-Ni(2+) hydroxide (β-Ni(OH)$_2$) particles having a secondary particle size of less than about 15 μm at a temperature in the range of about 200 to about 500° C.

Embodiment 7 is the method of embodiment 6, where in the NiO is $Ni_{1-y}M_yO_{1+\delta}$ and the single-phase spherical β-Ni(OH)$_2$ is $Ni_{1-y}M_y(OH)_2$; wherein M is one or more metal selected from the group consisting of Co, Mn, Al, Mg, Ti, B, Zr, Nb, and Mo; $0 \leq y \leq 0.1$; $0 \leq \delta \leq 0.05$.

Embodiment 8 is the method of embodiment 6 or 7, wherein the single-phase spherical β-Ni(OH)$_2$ particles are heated at a temperature in the range of about 325 to about 375° C.

Embodiment 9 is the method of any one of embodiments 1 to 5, wherein the nickel-containing precursor composition comprises about 100 mol % of the NiO.

Embodiment 10 is the method of any one of embodiments 1 to 5, wherein the nickel-containing precursor composition comprises about 100 mol % β-Ni(OH)$_2$.

Embodiment 11 is the method of any one of embodiments 1 to 10, wherein the lithium hydroxide is LiOH·H$_2$O.

Embodiment 12 is the method of any one of embodiments 1 to 11, wherein the stoichiometric mixture of the lithium hydroxide and the nickel-containing precursor composition is heated at about 665° C.

Embodiment 13 is an electrode active material for a lithium battery comprising a substantially defect-free layered lithium nickel(3+) oxide material of Formula (I): $Li_{(1-x)}(Ni_{(1-y)}M_y)_{(1+x)}O_2$; wherein M is one or more metal selected from the group consisting of Co, Mn, Al, Mg, Ti, B, Zr, Nb, and Mo; $0 \leq x \leq 0.05$; and $0 \leq y \leq 0.1$; and the material has a layered structure with no more than about 1.2 percent disorder between lithium and transition metal (TM) layers, as determined by structural refinement calculations on x-ray diffraction (XRD) data, compared to an ideal layered $LiNiO_2$ structure.

Embodiment 14 is the material of embodiment 13, wherein M is selected from the group consisting of Co, Mn, and Al.

Embodiment 15 is the material of embodiment 13 or embodiment 14, wherein $0 \leq x \leq 0.02$; and $0 \leq y \leq 0.05$.

Embodiment 16 is the material of any one of embodiments 13 to 15, wherein M is Co, x is 0 and y is 0.05, such that the material is substantially defect-free $LiNi_{0.95}Co_{0.05}O_2$.

Embodiment 17 is the material of embodiment 1, wherein both x and y are 0, such that the material is substantially defect-free $LiNiO_2$.

Embodiment 18 is an electrode active material for a lithium battery comprising a substantially defect-free layered lithium nickel(3+) oxide material of Formula (II): $Li_aNi_bM_cO_2$; wherein M is one or more metal selected from the group consisting of Co, Mn, Al, Mg, Ti, B, Zr, Nb, and Mo; $0.97 \leq a \leq 1.03$; $0.9 \leq b \leq 1$; $0 \leq c \leq 0.1$; and $0.97 \leq (b+c) \leq 1.03$; and the material has a layered structure with no more than about 1.2 percent disorder between lithium and transition metal (TM) layers, as determined by structural refinement calculations on x-ray diffraction (XRD) data, compared to an ideal layered $LiNiO_2$ structure.

Embodiment 19 is the material of embodiment 18, wherein M is selected from the group consisting of Co, Mn, and Al.

Embodiment 20 is the material of embodiment 18 or embodiment 19, wherein $0.95 \leq b \leq 1$; and $0 \leq c \leq 0.05$ Embodiment 21 is the material of any one of embodiments 18 to 20, wherein M is Co, $0.94 \leq b \leq 0.96$; and $0.04 \leq c \leq 0.06$.

Embodiment 22 is the material of any one of embodiments 18 to 21, wherein $0.97 \leq b \leq 1$, and c is 0.

Embodiment 23 is a substantially defect-free layered lithium nickel(3+) oxide electrode active material produced by the method of any one of embodiments 1 to 12.

Embodiment 24 is an electrode for an electrochemical cell comprising the electrode active material of any one of embodiments 13 to 23 and a particulate carbon material coated on a current collector with a binder.

Embodiment 25 is electrochemical cell comprising an anode, a cathode, and a lithium-containing electrolyte contacting the anode and cathode, wherein the cathode comprises the electrode active material of any one of embodiments 13 to 23.

Embodiment 26 is a battery comprising a plurality of the electrochemical cell of claim 25 electrically connected in series, in parallel, or in both series and parallel.

BRIEF DESCRIPTION OF THE DRAWINGS

FIG. 16 shows cycling performance for defect-free $LiNi_{0.95}Co_{0.05}O_2$ prepared at different temperatures.

FIG. 17 depicts a schematic representation of an electrochemical cell.

FIG. 18 depicts a schematic representation of a battery consisting of a plurality of cells connected electrically in series and in parallel.

DETAILED DESCRIPTION

Figure 1:
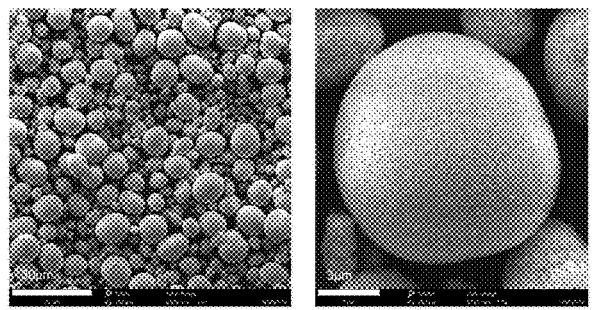
FIG. 1 provides electron micrographs showing particle morphology of a single phase β-$Ni(OH)_2$ precursor material.

The substantially defect-free layered LNO materials described herein, such as materials of Formula (I) and Formula (II) have low levels of Li/TM layer exchange (e.g., ≤1.2%) and exhibit surprisingly improved electrochemical profiles when utilized in lithium battery systems (e.g., as cathode materials). The materials are prepared by calcination of mixtures of lithium hydroxide and nickel-containing precursor materials (e.g., morphologically controlled nickel (2+) hydroxide or nickel(2+) oxide) optionally in combination with low levels (e.g., ≤10 mol %) of other metal elements (e.g., metal hydroxides or oxides) at relatively low temperatures (e.g., about 650 to about 680° C.). Advantageously, the calcination can be achieved in an air atmosphere. Conversion of β-$Ni(OH)_2$ precursor to NiO at temperatures in the range of 200 to 500° C. prior to calcination with LiOH hydrate provides LNO materials with even better electrochemical performance. This may be, in part, due to intragrain cracks that form in the LNO, which are not exposed to electrolyte during charge and discharge, but do relieve chemo-mechanical stresses cause by volume changes during cycling, and the intra-grain cracks help suppress undesirable inter-particle cracks.

Heating/calcination can be performed in any reactor capable of attaining the desired temperature, such as a muffle furnace, a rotary kiln, a shuttle kiln, an envelope kiln, a belt furnace, a fluid bed reactor, and the like, which are well known in the chemical engineering art.

The methods described herein allow for greater control over properties such as Li/TM site exchange, surface structures, stacking faults, residual lithium (e.g., $Li_2CO_3$) and particle morphologies conducive to cycling stability. The materials exhibit unexpectedly well-defined layered $LiNiO_2$ structures with stable cycling of substantial capacities over many charge/discharge cycles.

The substantially defect-free LNO materials described herein are particularly suitable for use as cathodes in lithium battery systems, because of the excellent electrochemical properties imparted to the materials by the highly stoichiometric layered $LiNiO_2$ structure having very low levels of Li/TM site exchange. Consequently, the materials described herein, particularly the materials of Formula (I) and Formula (II), address a long felt need for structurally-stable LNO materials with high Nickel content (TM layers comprising≥90 mole % Ni).

As used herein, the term "substantially defect-free" in relation to layered lithium nickel oxide materials of Formula (I) and Formula (II) means that the materials have no more than about 1.2 percent disorder between lithium and transition metal (TM) layers compared to an ideal layered $LiNiO_2$ structure, as determined by structural refinement calculations on x-ray diffraction (XRD) data. As is understood by those or ordinary skill in the battery arts, while compounds may be written in the form of Formula (I), (II), $LiNiO_2$, $LiNi_{0.95}Co_{0.05}O_2$, and the like, with an oxygen stoichiometry of $O_2$, often the oxygen stoichiometry can vary by up to about ±1% from the ideal $O_2$ stoichiometry. Thus, as used herein, formulae written with an oxygen stoichiometry of $O_2$ actually have an oxygen stoichiometry of $O_{(2\pm0.02)}$. Similarly, the lithium stoichiometry can vary from 1 by up to about ±0.03.

As used herein the phrase "a stoichiometric mixture" in reference to a mixture of lithium hydroxide and another metal hydroxide means that the lithium hydroxide and other metal hydroxide are present in a molar ratio sufficient to produce a target substantially defect-free layered lithium nickel(3+) oxide material, e.g. of Formula (I) or Formula (II) as described herein, when the metal hydroxides are heated to the temperature in the range of about 650 to about 680° C. Similarly, the phrase "adding a stoichiometric amount of lithium hydroxide to the metal hydroxide" means that the lithium hydroxide and other metal hydroxide are present in a molar ratio sufficient to produce the target substantially defect-free layered lithium nickel(3+) oxide material, e.g. of Formula (I) or Formula (II), when the metal hydroxides are heated to the temperature in the range of about 650 to about 680° C.

As used herein the term "lithium battery" refers to electrochemical cells and combinations of electrochemical cells in which lithium (e.g., lithium ion) shuttles between a Si anode and a cathode, and includes so-called full cells, as well as so-called half-cells (e.g. comprising a lithium metal anode).

If desired, the electrode materials described herein can include surface treatments and coatings to protect the surface of the electrode particles from undesirable reactions with the electrolyte, for example, by treating or coating the electrode particles with metal-oxide, metal-fluoride or metal-phosphate materials to shield the electrodes from highly oxidizing charging potentials and from other undesirable effects, such as electrolyte oxidation, oxygen loss, and/or dissolution. Such surface protection enhances the surface stability, rate capability and cycling stability of the electrode materials.

Electrodes for lithium electrochemical cells typically are formed by coating a slurry of electrode active material in a solvent with a polymeric binder (e.g., poly(vinylidene difluoride); PVDF) onto a current collector (e.g., metal foil, conductive carbon fiber paper, and the like), and drying the coating to form the electrode. Some examples of electrode active materials can be found, e.g., in Mekonnen, Y., Sundararajan, A. & Sarwat, A. I. "A review of cathode and anode materials for lithium-ion batteries," *SoutheastCon* 2016, Norfolk, VA, pp. 1-6, (2016), which is incorporated herein by reference in its entirety.

The electrodes utilize binders (e.g., polymeric binders) to aid in adhering cathode active materials to the current collectors. In some cases, the binder comprises a poly (carboxylic acid) or a salt thereof (e.g., a lithium salt), which can be any poly(carboxylic acid), such as poly(acrylic acid) (PAA), poly(methacrylic acid), alginic acid, carboxymethylcellulose (CMC), poly(aspartic acid) (PAsp), poly(glutamic acid) (PGlu), copolymers comprising poly(acrylic acid) chains, poly(4-vinylbenzoic acid) (PV4BA), and the like, which is soluble in the electrode slurry solvent system. The poly(carboxylic acid) can have a $M_n$, as determined by GPC, in the range of about 1000 to about 450,000 Daltons (preferably about 50,000 to about 450,000 Daltons, e.g., about 130,000 Daltons). In some other embodiments, the binder may comprise anionic materials or neutral materials such as fluorinated polymer such as poly(vinylidene difluoride) (PVDF), carboxymethylcellulose (CMC), and the like.

Lithium-ion electrochemical cells described herein comprise a cathode (positive electrode), an anode (negative electrode), and an ion-conductive separator between the cathode and anode, with the electrolyte in contact with both the anode and cathode, as is well known in the battery art. It is well understood that the function of a given electrode switches from being a positive or negative electrode depending on whether the electrochemical cell is discharging or charging. Nonetheless, for the sake of convenient identification, the terms "cathode" and "anode" as used herein are applied as identifiers for a particular electrode based only on its function during discharge of the electrochemical cell.

Cathodes typically are formed by combining a powdered mixture of the active material and some form of carbon (e.g., carbon black, graphite, or activated carbon) with a binder such as (polyvinylidene difluoride (PVDF), carboxymethyl-cellulose, and the like) in a solvent (e.g., N-methylpyrrolidone (NMP) or water) and the resulting mixture is coated on a conductive current collector (e.g., aluminum foil) and dried to remove solvent and form an active layer on the current collector.

The anode comprises a material capable of reversibly releasing and accepting lithium during discharging and charging of the electrochemical cell, respectively. Typically, the anode comprises a carbon material such as graphite, graphene, carbon nanotubes, carbon nanofibers, and the like, a silicon-based material such as silicon metal particles, a lead-based material such as metallic lead, a nitride, a silicide, a phosphide, an alloy, an intermetallic compound, a transition metal oxide, and the like. The anode active components typically are mixed with a binder such as (polyvinylidene difluoride (PVDF), carboxymethyl cellulose, and the like) in a solvent (e.g., NMP or water) and the resulting mixture is coated on a conductive current collector (e.g., copper foil) and dried to remove solvent and form an active layer on the current collector.

In some embodiments the anode may comprise silicon-containing particles, preferably combined with carbon particles. The silicon-containing particles can be silicon nanoparticles, silicon/silicon oxide (Si/SiOx) nanocomposite particles, silicon nanotubes, microporous silicon, an alloy or intermetallic compound of silicon with a metal such as magnesium, calcium, nickel, iron, or cobalt. Some examples of useful silicon-containing materials are discussed in Ma et al., *Nano-Micro Lett.*, 2014, 6(4):347-358, which is incorporated herein by reference in its entirety. Some other examples are mentioned in Zhu et al., *Chemical Science*, 2019 October, 7132., which is incorporated herein by reference in its entirety. Si/SiOx nanocomposite particles include e.g., materials described in co-owned U.S. Pat. No. 10,714,745 to Wenquan Lu et al, which is incorporated herein by reference in its entirety.

In electrochemical cell and battery embodiments described herein, the electrolyte preferably comprises an electrolyte salt (e.g., an electrochemically stable lithium salt or a sodium salt) dissolved in a non-aqueous solvent. Any lithium electrolyte salt can be utilized in the electrolyte compositions for lithium electrochemical cells and batteries described herein, such as the salts described in Jow et al. (Eds.), *Electrolytes for Lithium and Lithium-ion Batteries*; Chapter 1, pp. 1-92; Springer; New York, NY (2014), which is incorporated herein by reference in its entirety.

Non-limiting examples of lithium salts include, e.g., lithium bis(trifluoromethanesulfonyl)imidate (LiTFSI), lithium 2-trifluoromethyl-4,5-dicyanoimidazolate (LiTDI), lithium 4,5-dicyano-1,2,3-triazolate (LiDCTA), lithium trifluoromethanesulfonate (LiTf), lithium perchlorate (LiClO$_4$), lithium bis(oxalato)borate (LiB(C$_2$O$_4$)$_2$ or "LiBOB"), lithium difluoro(oxalato)borate (LiF$_2$BC$_2$O$_4$ or "LiDFOB"), lithium tetrafluoroborate (LiBF$_4$), lithium hexafluorophosphate (LiPF$_6$), lithium hexafluoroarsenate (LiAsF$_6$), lithium thiocyanate (LiSCN), lithium bis(fluorosulfonyl)imidate (LiFSI), lithium bis(pentafluoroethylsulfonyl)imidate (LiBETI), lithium tetracyanoborate (LiB(CN)$_4$), lithium nitrate, combinations of two or more thereof, and the like. The lithium salt can be present in the electrolyte solvent at any concentration suitable for lithium battery applications, which concentrations are well known in the secondary battery art. As used herein the term "lithium battery" refers to electrochemical cells and combinations of electrochemical cells in which lithium (e.g., lithium ion) shuttles between an anode and a cathode, and includes so-called full cells with an anode material (e.g., graphite) that can accommodate intercalated lithium ions, as well as so-called half-cells in which the anode is lithium metal. In some embodiments, the lithium salt is present in the electrolyte at a concentration in the range of about 0.1 M to about 5 M, e.g., about 0.5 M to 2 M, or 1 M to 1.5 M. A preferred lithium salt is LiPF$_6$.

The non-aqueous solvent for the electrolyte compositions include the solvents described in Jow et al. (Eds.), *Electrolytes for Lithium and Lithium-ion Batteries*; Chapter 2, pp. 93-166; Springer; New York, NY (2014), which is incorporated herein by reference in its entirety. Non-limiting examples of solvents for use in the electrolytes include, e.g., an ether, a carbonate ester (e.g., a dialkyl carbonate or a cyclic alkylene carbonate), a nitrile, a sulfoxide, a sulfone, a fluoro-substituted linear dialkyl carbonate, a fluoro-substituted cyclic alkylene carbonate, a fluoro-substituted sulfolane, and a fluoro-substituted sulfone. For example, the solvent can comprise an ether (e.g., glyme or diglyme), a linear dialkyl carbonate (e.g., dimethyl carbonate (DMC), diethyl carbonate (DEC), ethyl methyl carbonate (EMC) and the like), a cyclic alkylene carbonate (ethylene carbonate (EC), propylene carbonate (PC) and the like), a sulfolane (e.g., sulfolane or an alkyl-substituted sulfolane), a sulfone (e.g., a dialkyl sulfone such as a methyl ethyl sulfone), a fluoro-substituted linear dialkyl carbonate, a fluoro-substituted cyclic alkylene carbonate, a fluoro-substituted sulfolane, and a fluoro-substituted sulfone. The solvent can comprise a single solvent compound or a mixture of two or more solvent compounds.

In some embodiments, the non-aqueous solvent for a lithium electrochemical cell as described herein can be an ionic liquid. Any electrochemically stable ionic liquid solvent can be utilized in the electrolytes described herein, such as the solvents described in Jow et al. (Eds.), *Electrolytes for Lithium and Lithium-ion Batteries*; Chapter 4, pp. 209-226; Springer; New York, NY (2014), which is incorporated herein by reference in its entirety. In the case of lithium electrochemical cells and batteries, the ionic liquid can optionally include a lithium cation, and can act directly as the electrolyte salt.

The electrolyte compositions for lithium electrochemical cells and batteries described herein also can optionally comprise an additive such as those described in Jow et al. (Eds.), *Electrolytes for Lithium and Lithium-ion Batteries*; Chapter 3, pp. 167-182; Springer; New York, NY (2014), which is incorporated herein by reference in its entirety. Such additives can provide, e.g., benefits such as SEI, cathode protection, electrolyte salt stabilization, thermal stability, safety enhancement, overpotential protection, corrosion inhibition, and the like. The additive can be present in the electrolyte at any concentration, but in some embodiments is present at a concentration in the range of about 0.0001 M to about 0.5 M. In some embodiments, the additive is present in the electrolyte at a concentration in the range of about 0.001 M to about 0.25 M, or about 0.01 M to about 0.1 M.

Electrochemical cells typically comprise a cathode, an anode typically comprising carbon, silicon, lead, metallic lithium, some other anode active material, or a combination thereof; and a porous separator between the cathode and anode, with the electrolyte in contact with the anode, the cathode and the separator.

A battery can be formed by electrically connecting two or more such electrochemical cells in series, parallel, or a combination of series and parallel. The electrodes described herein preferably are utilized as the anode in a full-cell configuration in lithium-ion and sodium-ion cells and batteries. Electrochemical cells and battery designs and configurations, anode and cathode materials, as well as electrolyte salts, solvents and other battery or electrode components (e.g., separator membranes, current collectors), which can be used in the electrolytes, cells and batteries described herein, are well known in the secondary battery art, e.g., as described in "Lithium Batteries Science and Technology" Gholam-Abbas Nazri and Gianfranco Pistoia, Eds., Springer Science+Business Media, LLC; New York, NY (2009), which is incorporated herein by reference in its entirety.

The separator component of the lithium-ion cell can be any separator used in the lithium battery art. A typical material is a porous polyalkylene material such as microporous polypropylene, microporous polyethylene, a microporous propylene-ethylene copolymer, or a combination thereof, e.g., a separator with layers of different polyalkylenes; a poly(vinylidene-difluoride)-polyacrylonitrile graft copolymer microporous separator; and the like.

Examples of suitable separators are described in Arora et al., Chem. Rev. 2004, 104, 4419-4462, which is incorporated herein by reference in its entirety. In addition, the separator can be an ion-selective ceramic membrane such as those described in Nestler et al., *AIP Conference Proceedings* 1597, 155 (2014), which is incorporated herein by reference in its entirety.

Processes used for manufacturing lithium cells and batteries are well known in the art. The active electrode materials are coated on both sides of metal foil current collectors (typically copper for the anode and aluminum for the cathode) with suitable binders such as PVDF and the like to aid in adhering the active materials to the current collectors. In the cells and batteries described herein, the active cathodes are the layered lithium nickel oxide materials of Formula (I), as defined herein, which optionally can be utilized with a carbon material such as graphite, and the anode active material typically is a lithium metal, carbon, and the like. Cell assembly typically is carried out on automated equipment. The first stage in the assembly process is to sandwich a separator between the anode and the cathode. The cells can be constructed in a stacked structure for use in prismatic cells, or a spiral wound structure for use in cylindrical cells. The electrodes are connected to terminals and the resulting sub-assembly is inserted into a casing, which is then sealed, leaving an opening for filling the electrolyte into the cell. Next, the cell is filled with the electrolyte and sealed under moisture-free conditions.

Once the cell assembly is completed, the cell typically is subjected to at least one controlled charge/discharge cycle to activate the electrode materials and in some cases form a solid electrolyte interface (SEI) layer on the anode. This is known as formation cycling. The formation cycling process is well known in the battery art and involves initially charging with a low voltage (e.g., substantially lower that the full-cell voltage) and gradually building up the voltage. The SEI acts as a passivating layer which is essential for moderating the charging process under normal use. The formation cycling can be carried out, for example, according to the procedure described in Long et al. *J. Electrochem. Soc.*, 2016; 163 (14): A2999-A3009, which is incorporated herein by reference in its entirety. This procedure involves a 1.5 V tap charge for 15 minutes at C/3 current limit, followed by a 6-hour rest period, and then 4 cycles at C/10 current limit, with a current cutoff (i≤0.05 C) at the top of each charge.

Cathodes comprising the electrode active materials described herein can be utilized with any combination of anode and electrolyte in any type of rechargeable battery system that utilizes a non-aqueous electrolyte.

The following non-limiting Examples are provided to illustrate certain features of the compositions and methods described herein.

Example 1. Synthesis of Defect-Free Layered $LiNiO_2$ Materials

Synthesis from Morphology Controlled $\beta$-Ni(OH)$_2$ Precursor

Morphology controlled $\beta$-Ni(OH)$_2$ precursor was first prepared by a co-precipitation reaction in an aqueous solution containing nickel sulfate (NiSO$_4$) with ammonia solution as chelating agent and sodium hydroxide. The morphology controlled $\beta$-Ni(OH)$_2$ was then mixed with LiOH·H$_2$O and calcined at various temperatures as described below, to form the LNO product. In a preferred example, stoichiometric amounts of the precursors were thoroughly mixed using the acoustic mixer, and calcined at 665° C. for approximately 12 hours under oxygen flow. The heating rate was about 2° C. per min, and the samples were cooled in the furnace without controlling the cooling rate.

Figure 2:
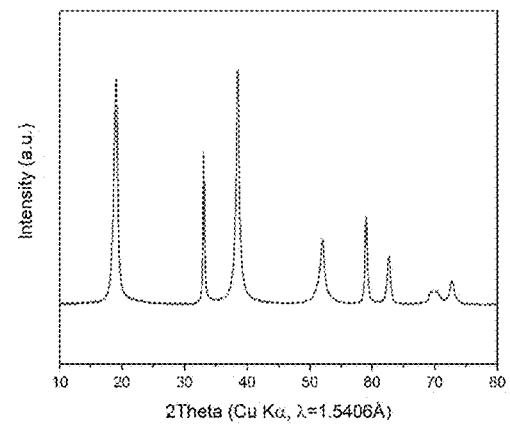
FIG. 2 provides an x-ray diffraction (XRD) plot for a $Ni(OH)_2$ precursor material.

FIG. 1 shows micrographic images of the morphology controlled $\beta$-Ni(OH)$_2$, demonstrating that the material has spherical secondary particle morphology, with an average diameter is less than about 15 μm. FIG. 2 provides XRD data consistent with a $\beta$-Ni(OH)$_2$ structure.

Figure 3:
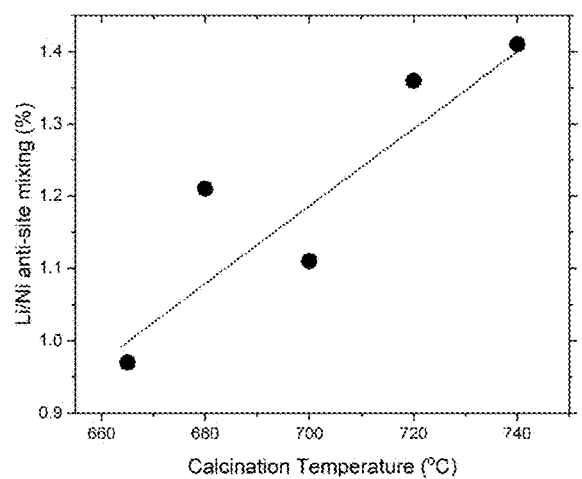
FIG. 3 provides a graph showing the degree of Li/Ni anti-site mixing for LNO materials made from single phase β-$Ni(OH)_2$ precursor at different temperatures as determined by XRD refinement data.

FIG. 3 provides a graph showing the degree of Li/Ni anti-site mixing for LNO materials made from single phase $\beta$-Ni(OH)$_2$ precursor at different temperatures as determined by XRD refinement data. As shown in FIG. 1, materials formed at about 665 to about 700° C. had less than or equal to about 1.2% Li/Ni anti-site mixing.

Figure 4:
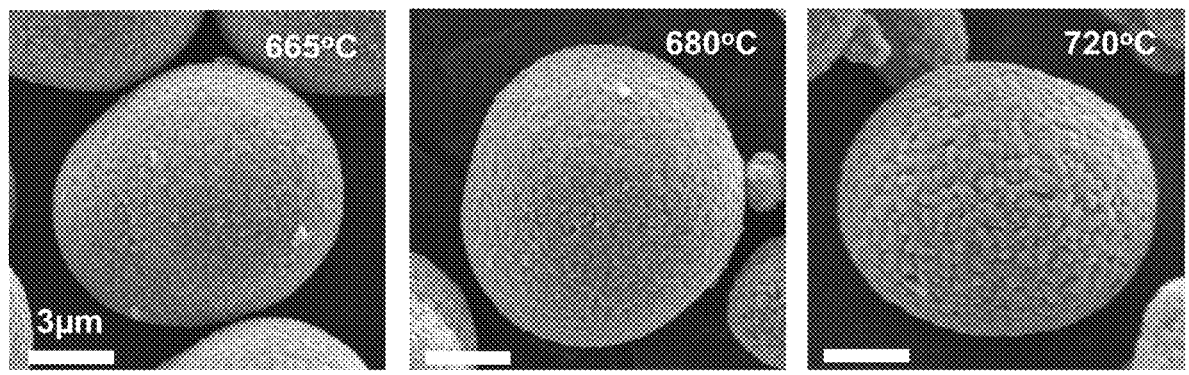
FIG. 4 provides micrographic images showing particle morphology of LNO made from a single phase β-$Ni(OH)_2$ precursor material at different temperatures.

FIG. 4 compares microscopy images of the morphologies of LiNiO$_2$ materials described herein prepared at 665, 680, and 720° C. While the same secondary particle morphologies are observed for all the samples, the size of the primary particles increases with the synthesis temperature. The very low synthesis temperature of 665° C., thereby, plays an important role in enabling defect-free structures where particle growth at higher temperatures leads to more defects.

Synthesis from Controlled Morphology $\beta$-Ni(OH)$_2$ Precursor Under a Low Partial Pressure Oxygen Atmosphere (Air)

The incrementally different ratio from 20 to 100% oxygen balanced by nitrogen was customized to lowering oxygen partial pressure for LNO calcination. The mixture of Nickel hydroxide with a well ground lithium hydroxide precursors are calcined at 665° C. for 12 hr holding with 2° C./min ramp in different oxygen partial pressure environmental atmosphere without cooling control.

Synthesis from Controlled Morphology NiO Precursor

Conversion of $\beta$-Ni(OH)$_2$ precursor to NiO was carried out with annealing at 350° C. prior to calcination of final LNO. The prepared NiO precursor was mixed with well-ground LiOH·H$_2$O and calcined at 665° C. for 12 hr with 2° C./min under oxygen atmosphere without any cooling control.

Figure 12:
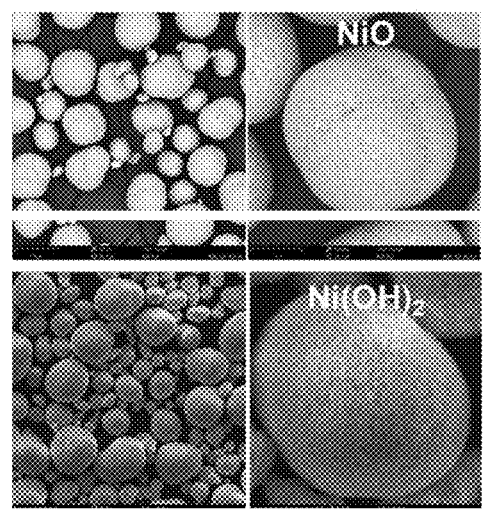
FIG. 12 shows micrographic images of $Ni(OH)_2$ before annealing at 350° C., and the resulting NiO obtained after annealing.

FIG. 12 shows micrographic images of Ni(OH)$_2$ before annealing at 350° C., and the resulting NiO obtained after annealing and illustrates the controlled, substantially spherical morphology of the materials both before and after annealing.

Example 2. Synthesis of Defect-Free Layered $LiNi_{0.95}Co_{0.05}O_2$

Morphology controlled $\beta$-Ni$_{0.95}$Co$_{0.05}$(OH)$_2$ precursor was first prepared by a co-precipitation reaction in an aqueous solution containing stoichiometric nickel sulfate (NiSO$_4$) and cobalt sulfate (CoSO$_4$) with ammonia solution as chelating agent and sodium hydroxide. The morphology controlled $\beta$-Ni$_{0.95}$Co$_{0.05}$(OH)$_2$ was then mixed with LiOH·H$_2$O and calcined at various temperatures as described below, to form the LiNi$_{0.95}$Co$_{0.05}$O$_2$ product.

Example 3. Electrochemical Evaluations

Coin-type cells (2032, Hohsen) are constructed in an argon-filled glovebox (<5 ppm O$_2$ and H$_2$O). The cathode consists of approximately 88 percent by weight (wt %) of $Li_aNi_bM_cO_2$ (M=Co, Mn, Al, Mg, and Ti, 6 wt % carbon, and 6 wt % PVDF binder on aluminum foil. The anode is metallic lithium foil. The electrolyte is 1.2 M $LiPF_6$ in a 3:7 (w/w) mixture of ethylene carbonate and ethyl-methyl carbonate. For the cycling experiments, $Li/Li_aNi_bM_cO_2$ cells (M=Co, Mn, Al, Mg, and Ti.) are galvanostatically charged and discharged between 2.8 and 4.3 V at a current rate of either approximately 20 mA/g or approximately 60 mA/g.

Results and Discussion

Figure 5:
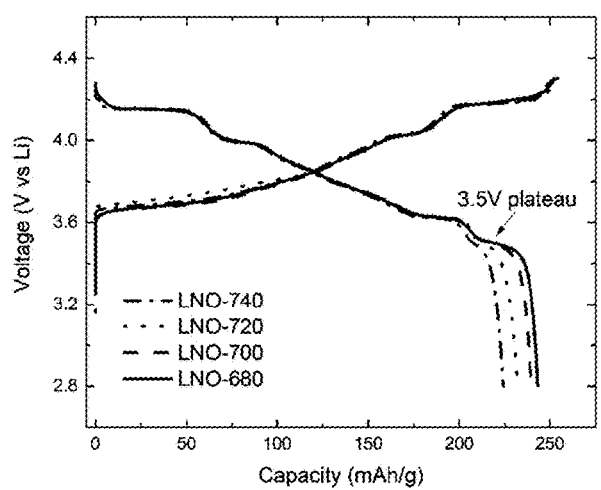
FIG. 5 shows a plot of Voltage versus Capacity for LNO materials made from a single phase β-$Ni(OH)_2$ precursor material at different temperatures.

FIG. 5 shows the initial electrochemical profiles of the oxides of FIG. 4 in coin-type cells using lithium metal anodes. Initially, when cycled between about 4.3 to about 2.8 V, the electrochemical responses are near identical except for the discharge plateau at about 3.5 V. It can be observed that the length (capacity gained) of this plateau decreases as calcination temperature, and Li/Ni exchange values, increase. These results reveal good, and unexpected, kinetic performance that is not reported for state-of-the-art $LiNiO_2$ (typically made at about 700° C. or higher) at discharge rates as slow as about C/50. In fact, results in FIG. 5 were obtained at 5 times that rate (i.e., at C/10). The low state of charge (SOC) kinetics of the oxides made at less than 700° C. result in very high first-cycle efficiencies of greater than about 95% leading to substantially increased cycling capacity.

Figure 6:
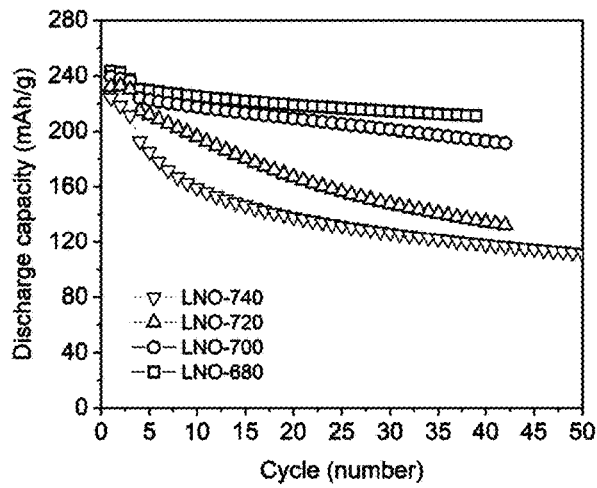
FIG. 6 shows a plot of Discharge Capacity versus Cycle Number for LNO materials made from a single phase β-$Ni(OH)_2$ precursor material at different temperatures.

FIG. 6 shows the cycling performance as a function of synthesis temperature in coin-type cells using lithium metal anodes. The data here show a clear distinction in the two groups of samples, classified as less than about 700° C. (LNO-LT) and greater than about 700° C. (LNO-HT), and reveal the unexpected correlation between very small differences in Li/Ni exchange values (greater than about 1.2% and less than about 1.4%), very low-temperature synthesis, low SOC kinetics, and cycling stability. From FIG. 6 it is apparent that the combination of these factors, resulting in a never-before-reported, defect-free $LiNiO_2$ structure, has a dramatic and unexpected positive influence on electrochemical performance.

Figure 7:
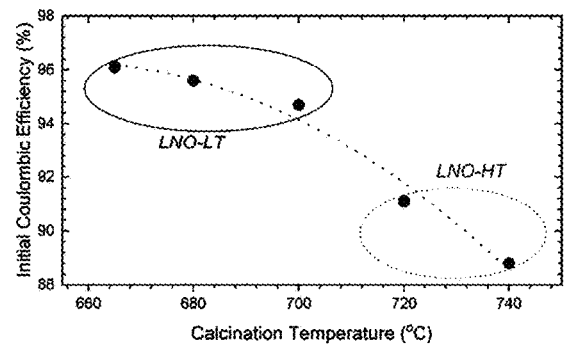
FIG. 7 shows a plot of initial coulombic efficiency (ICE %) versus Calcination Temperature for LNO materials made from a single phase β-$Ni(OH)_2$ precursor material at different temperatures.

FIG. 7 provides a plot of initial coulombic efficiency (ICE %) versus calcination temperature, which clearly shows a drop-off in ICE % as temperature increases. The best performance is seen at 665 and 680° C.

Figure 8:
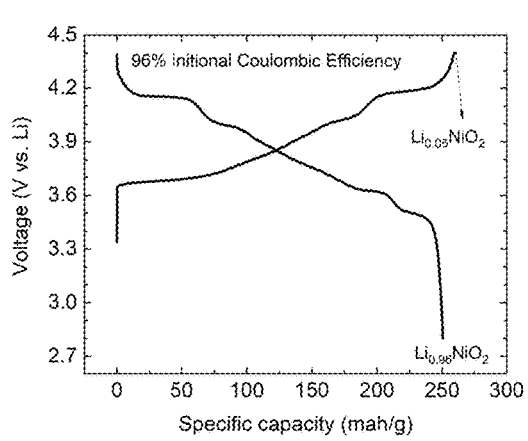
FIG. 8 shows a plot of Voltage versus Specific Capacity for an LNO material made from a single phase β-$Ni(OH)_2$ precursor at 665° C.

FIG. 8 shows a plot of Voltage versus Specific Capacity for an LNO material made from a single phase $\beta$-$Ni(OH)_2$ precursor at 665° C. The material exhibited excellent first charge Q of 260 mAh/g and a first discharge Q of 250 mAh/g, with a first cycle coulombic efficiency of about 96%. The material also exhibited greater than 95% capacity retention at about 235 mAh/g after 40 cycles.

Figure 9:
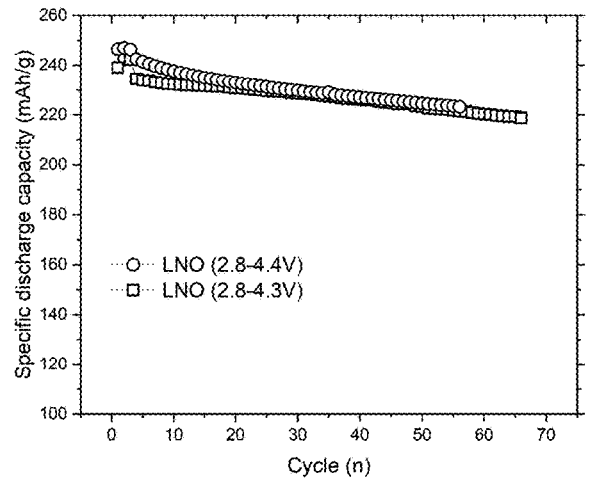
FIG. 9 shows a plot of Specific Capacity versus Cycle Number for an LNO material made from a single phase β-$Ni(OH)_2$ precursor at 665° C. (labeled optimized LNO) at upper cut off voltages (UCV) or 4.4 V and 4.3 V.

FIG. 9 shows a plot of Specific Capacity versus Cycle Number for an LNO material made from a single phase $\beta$-$Ni(OH)_2$ precursor at 665° C. (labeled optimized LNO) at UCV values of 4.4 V and 4.3 V for 40 cycles. Cycling retention was about 93% after 40 cycles at 4.4 UCV, and 96% at 4.3 UCV. Thus, there was a significant improvement in performance when cycling was limited to 4.3 UCV. Even at 4.4 UCV, the defect-free LNO described herein shows significant advantages over high temperature LNO materials reported in the literature. Sun et al. *ACS Energy Lett.* 2017, 2, 5, 1150-1155 reported 90% cycling retention after 40 cycles atvc 4.4 UCV for a LNO made at higher temperature. Similarly, Kanda et al. *Journal of Power Sources*, Volume 54, Issue 2, April 1995, 209-213, reported about 90% cycling retention after only about 15 cycles for another LNO made at higher temperatures.

Figure 10:
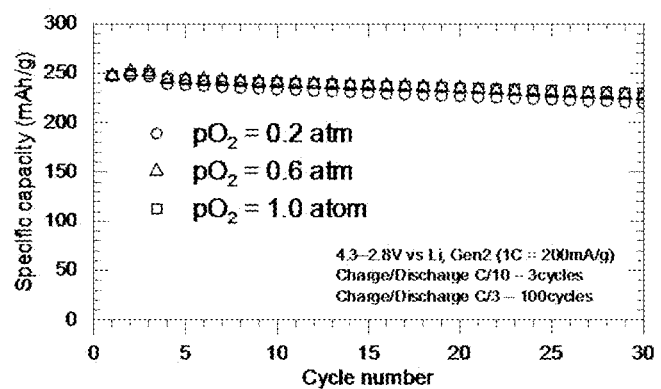
FIG. 10 shows a plot of Specific Capacity versus Cycle Number for LNO materials made from a single phase β-$Ni(OH)_2$ precursor at 665° C. in an atmospheres containing different partial pressures of oxygen.

FIG. 10 compares the cycling performance of defect-free LNO synthesized at 665° C. under $O_2/N_2$ gas mixtures having different oxygen partial pressures, from a low $pO_2$ of about 0.2 atm (air) to a high $pO_2$ of about 1.0 atm (pure oxygen). All of the electrodes achieved a remarkable capacity of about 250 mAh/g for 30 cycles. Unexpectedly, the LNO cathodes synthesized at 665° C. exhibit negligible performance-dependence when synthesized in a dry $O_2$ and $N_2$ gas mixtures with different oxygen partial pressures. In particular, $O_2$ pressures as low as 0.2 atm resulted in exceptional structure and performance, whereas it is generally accepted that pure oxygen atmospheres are needed to achieve optimal performance of LNO and Ni-rich (e.g., 80% Ni) oxides made at conventional higher temperatures.

Figure 11:
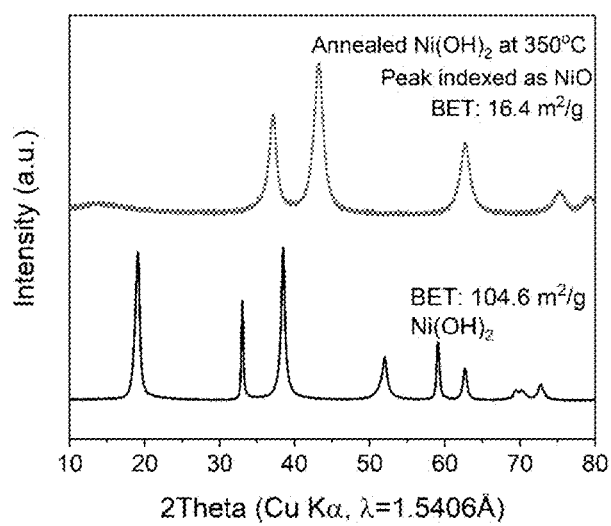
FIG. 11 shows XRD results for $Ni(OH)_2$ before annealing at 350° C., and the resulting NiO obtained after annealing.

The low-temperature synthesis method described herein was further improved by optimization of the nickel precursor (e.g., $Ni(OH)_2$) prior to calcination/lithiation. Here, the $Ni(OH)_2$ precursor was subjected to annealing at about 350° C. in a nitrogen gas atmosphere for only about 30 min. XRD results of the $Ni(OH)_2$ before and after annealing (FIG. 11) indicate that the annealed $Ni(OH)_2$ is completely converted to NiO. A conversion to NiO under these conditions, prior to calcination/lithiation, further facilitates low-temperature synthesis of the LNO and utilization of lithium by mitigating surface impurities such as lithium hydroxide and lithium carbonate by removal of water and creating primary particle morphologies that facilitate the lithiation and result in the excellent cycling behavior as described below, further optimizing the results of low-temperature calcination. The defect-free LNO from the NiO precursor shows even better performance and cycling stability than the defect-free LNO from the $Ni(OH)_2$ precursors discussed above. Cross-sectional TEM images of the LNO particles made from NiO precursor after about 100 cycles show the formation of isolated, intra-grain cracks that are not exposed to the electrolyte. These isolated intra-grain cracks effectively release the chemo-mechanical stresses induced by repeated volume changes during cycling. It is believed that these intra-grain cracks are advantageous as they suppress the generation of inter-particle cracks that lead to newly formed surfaces. When in contact with electrolyte, such new surfaces reconstruct to form disordered rock salt phases that increase interfacial impedance and capacity loss.

Figure 13:
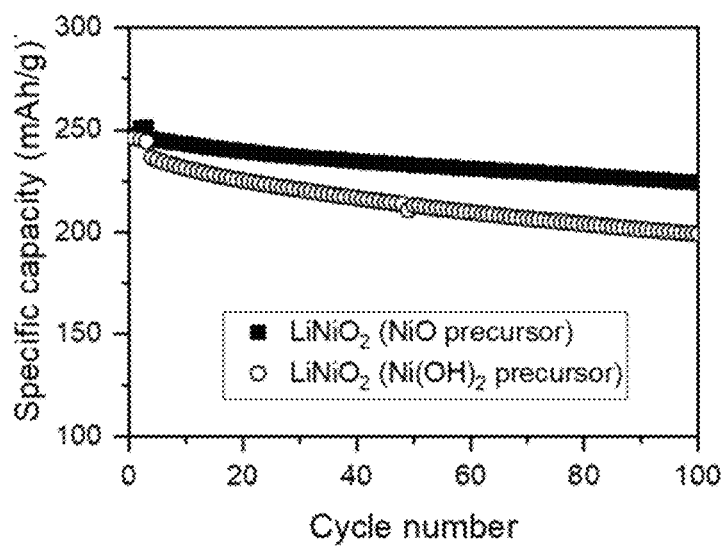
FIG. 13 shows cycling stability results for the $LiNiO_2$ formed from the NiO precursor compared to LNO made from $Ni(OH)_2$ precursor.

The combination of low-temperature conversion of $Ni(OH)_2$ to NiO, followed by low-temperature (e.g., 665° C.) calcination/lithiation, leads to defect-free $LiNiO_2$ with primary particle morphologies capable of facilitating low-temp lithiation and alleviating mechanical fractures that expose fresh surfaces to electrolytes with high SOC cycling. The data of FIG. 13 represent highly unexpected cycling stability for such high SOC cycling of $LiNiO_2$.

Figure 14:
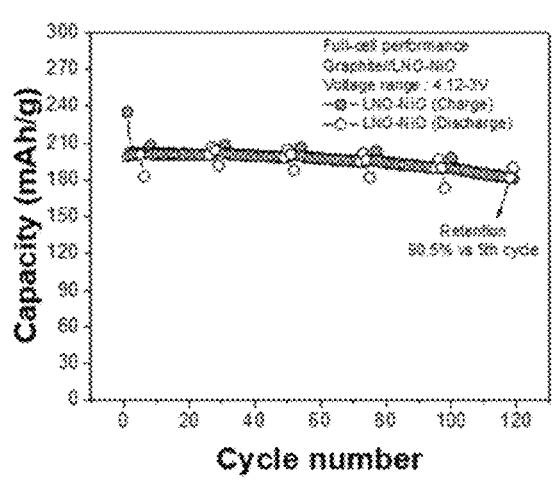
FIG. 14 shows cycling data for full cells (graphite anodes) utilizing the LNO cathode material made from NiO at 665° C.
Figure 15:
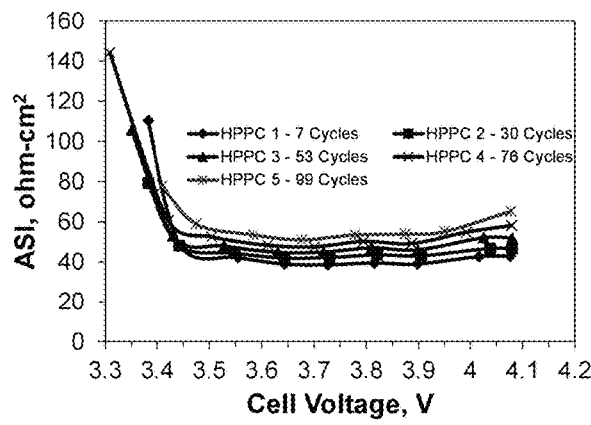
FIG. 15 shows corresponding area specific impedance (ASI) data for the same cells as in FIG. 14.

FIG. 14 and FIG. 15 show the full cell performance (graphite anodes) of the LNO cathode material made from NiO, synthesized at 665° C. Here, three-hour holds are used at the top of each charge (4.12 V) to test the stability limits of the defect-free, $LiNiO_2$ cathode-oxide. Excellent cycling stability (FIG. 14) was exhibited for about 120 charge/discharge cycles with negligible impedance growth during the prolonged cycles. These data represent the best performance ever reported for pure $LiNiO_2$ compositions. The corresponding area specific impedance (ASI) data are shown in FIG. 15.

FIG. 16 provides cycle performance results for LiNi$_{0.95}$Co$_{0.05}$O$_2$ synthesized in an oxygen atmosphere at temperatures ranging from 680 to about 740° C.

Overall, the defect-free LNO materials of Formula (I) and (II) described herein show unexpectedly high first cycle capacity, cycling stability, and improved SOC kinetics compared to LNO materials prepared by the higher temperature syntheses described in the prior art.

Example 4. Electrochemical Cells and Batteries

FIG. 17 schematically illustrates a cross-sectional view of a lithium-ion electrochemical cell 10 comprising first electrode 12 comprising a cathode active material as described herein, and a second electrode 14, with separator 16 therebetween. A lithium-containing electrolyte 18, comprising a solution of a lithium salt in a non-aqueous solvent, contacts electrodes 12 and 14 and separator 16. The electrodes, separator and electrolyte are sealed within housing 19. FIG. 18 schematically illustrates a lithium-ion battery comprising a first array 20 consisting of three series-connected electrochemical cells 10, and a second array 22 consisting of three series-connected electrochemical cells 10, in which first array 20 is electrically connected to second array 22 in parallel.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The terms "consisting of" and "consists of" are to be construed as closed terms, which limit any compositions or methods to the specified components or steps, respectively, that are listed in a given claim or portion of the specification. In addition, and because of its open nature, the term "comprising" broadly encompasses compositions and methods that "consist essentially of" or "consist of" specified components or steps, in addition to compositions and methods that include other components or steps beyond those listed in the given claim or portion of the specification. Recitation of ranges of values herein are merely intended to serve as a shorthand method of referring individually to each separate value falling within the range, unless otherwise indicated herein, and each separate value is incorporated into the specification as if it were individually recited herein. All numerical values obtained by measurement (e.g., weight, concentration, physical dimensions, removal rates, flow rates, and the like) are not to be construed as absolutely precise numbers, and should be considered to encompass values within the known limits of the measurement techniques commonly used in the art, regardless of whether or not the term "about" is explicitly stated. All methods described herein can be performed in any suitable order unless otherwise indicated herein or otherwise clearly contradicted by context. The use of any and all examples, or exemplary language (e.g., "such as") provided herein, is intended merely to better illuminate certain aspects of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The embodiments of the invention in which an exclusive property or privilege is claimed are defined as follows:

1. A method of preparing a substantially defect-free layered lithium nickel(3+) oxide material having no more than about 1.2 percent disorder between lithium and transition metal (TM) layers, as determined by structural refinement calculations on x-ray diffraction (XRD) data, compared to an ideal layered LiNiO$_2$ structure; the method comprising:

heating a stoichiometric mixture of lithium hydroxide and a nickel-containing precursor composition at a temperature in the range of about 650 to about 680° C., in an oxygen-containing atmosphere, for a time sufficient to form the substantially defect-free layered lithium nickel(3+) oxide material;

wherein the nickel-containing precursor composition comprises:

(a) a metal hydroxide composition that comprises at least about 90 mol % single-phase spherical β-Ni(2+) hydroxide (β-Ni(OH)$_2$) particles having a secondary particle size of less than about 15 μm, optionally in combination with up to about 10 mol % of M hydroxide; or (b) a metal oxide composition comprising at least about 90 mol % NiO particles having a secondary particle size of less than about 15 μm, optionally in combination with up to about 10 mol % of an M hydroxide and/or an M oxide;

wherein M is at least one metal selected from the group consisting of Co, Mn, Al, Mg, Ti, B, Zr, Nb, and Mo.

2. The method of claim 1, wherein the substantially defect-free layered lithium nickel(3+) oxide material is a material of Formula (I): Li$_{(1-x)}$(Ni$_{(1-y)}$M$_y$)$_{(1+x)}$O$_2$; wherein M is one or more metal selected from the group consisting of Co, Mn, and Al; $0 \leq x \leq 0.05$; and $0 \leq y \leq 0.1$.

3. The method of claim 1, wherein the substantially defect-free layered lithium nickel(3+) oxide material is a material of Formula (II): Li$_a$Ni$_b$M$_c$O$_2$; wherein M is one or more metal selected from the group consisting of Co, Mn, and Al; $0.97 \leq a \leq 1.03$; $0.9 \leq b \leq 1$; $0 \leq c \leq 0.1$; and $0.97 \leq (b+c) \leq 1.03$.

4. The method of claim 1, wherein M is selected from the group consisting of Co, Mn, and Al.

5. The method of claim 1, wherein the oxygen-containing atmosphere is air.

6. The method of claim 1, further comprising the step of preparing the NiO by heating single-phase spherical β-Ni(2+) hydroxide (β-Ni(OH)$_2$) particles having a secondary particle size of less than about 15 μm at a temperature in the range of about 200 to about 500° C.

7. The method of claim 6, wherein the NiO is $Ni_{1-y}M_yO_{1+\delta}$ and the single-phase spherical $\beta$-$Ni(OH)_2$ is $Ni_{1-y}M_y(OH)_2$; wherein M is one or more metal selected from the group consisting of Co, Mn, Al, Mg, Ti, B, Zr, Nb, and Mo; $0 \leq y \leq 0.1$; $0 \leq \delta \leq 0.05$.

8. The method of claim 6, wherein the single-phase spherical $\beta$-Ni(2+) hydroxide ($\beta$-$Ni(OH)_2$) particles are heated at a temperature in the range of about 325 to about 375° C.

9. The method of claim 6, wherein the nickel-containing precursor composition comprises about 100 mol % of the NiO; and the nickel-containing precursor composition comprises about 100 mol % $\beta$-$Ni(OH)_2$.

10. The method of claim 1, wherein the lithium hydroxide is $LiOH \cdot H_2O$.

11. The method of claim 1, wherein the stoichiometric mixture of the lithium hydroxide and the nickel-containing precursor composition is heated at about 665° C.

12. The material of claim 1, wherein both x and y are 0, such that the material is substantially defect-free $LiNiO_2$.

13. A substantially defect-free layered lithium nickel(3+) oxide material produced by the method of claim 1.

14. An electrode active material for a lithium battery comprising a substantially defect-free layered lithium nickel (3+) oxide material of Formula (I): $Li_{(1-x)}(Ni_{(1-y)}M_y)_{(1+x)}O_2$; wherein M is one or more metal selected from the group consisting of Co, Mn, Al, Mg, Ti, B, Zr, Nb, and Mo; $0 \leq x \leq 0.05$; and $0 \leq y \leq 0.1$; and the material has a layered structure with no more than about 1.2 percent disorder between lithium and transition metal (TM) layers, as determined by structural refinement calculations on x-ray diffraction (XRD) data, compared to an ideal layered $LiNiO_2$ structure.

15. The material of claim 14, wherein M is selected from the group consisting of Co, Mn, and Al.

16. The material of claim 14, wherein $0 \leq x \leq 0.02$; and $0 \leq y \leq 0.05$.

17. The material of claim 14, wherein M is Co, x is 0 and y is 0.05, such that the material is substantially defect-free $LiNi_{0.95}Co_{0.05}O_2$.

18. An electrode for an electrochemical cell comprising the electrode active material of claim 14 and a particulate carbon material coated on a current collector with a binder.

19. An electrochemical cell comprising an anode, a cathode, and a lithium-containing electrolyte contacting the anode and cathode, wherein the cathode comprises the electrode active material of claim 14.

20. A battery comprising a plurality of the electrochemical cell of claim 19 electrically connected in series, in parallel, or in both series and parallel.

21. An electrode active material for a lithium battery comprising a substantially defect-free layered lithium nickel (3+) oxide material of Formula (II): $Li_aNi_bM_cO_2$; wherein M is one or more metal selected from the group consisting of Co, Mn, Al, Mg, Ti, B, Zr, Nb, and Mo; $0.97 \leq a \leq 1.03$; $0.9 \leq b \leq 1$; $0 \leq c \leq 0.1$; and $0.97 \leq (b+c) \leq 1.03$; and the material has a layered structure with no more than about 1.2 percent disorder between lithium and transition metal (TM) layers, as determined by structural refinement calculations on x-ray diffraction (XRD) data, compared to an ideal layered $LiNiO_2$ structure.

22. The material of claim 21, wherein M is selected from the group consisting of Co, Mn, and Al.

23. The material of claim 21, wherein $0.95 \leq b \leq 1$; and $0 \leq c \leq 0.05$.

24. The material of claim 21, wherein M is Co, $0.94 \leq b \leq 0.96$; and $0.04 \leq c \leq 0.06$.

25. The material of claim 21, wherein $0.98 \leq b \leq 1$, and c is 0.

26. An electrode for an electrochemical cell comprising the electrode active material of claim 21 and a particulate carbon material coated on a current collector with a binder.

27. An electrochemical cell comprising an anode, a cathode, and a lithium-containing electrolyte contacting the anode and cathode, wherein the cathode comprises the electrode active material of claim 21.

28. A battery comprising a plurality of the electrochemical cell of claim 27 electrically connected in series, in parallel, or in both series and parallel.

* * * * *